Jan. 13, 1942.  H. A. ROSE  2,269,862
REPRODUCTION AND RECORDING OF RACES
Filed Aug. 1, 1941  2 Sheets-Sheet 1
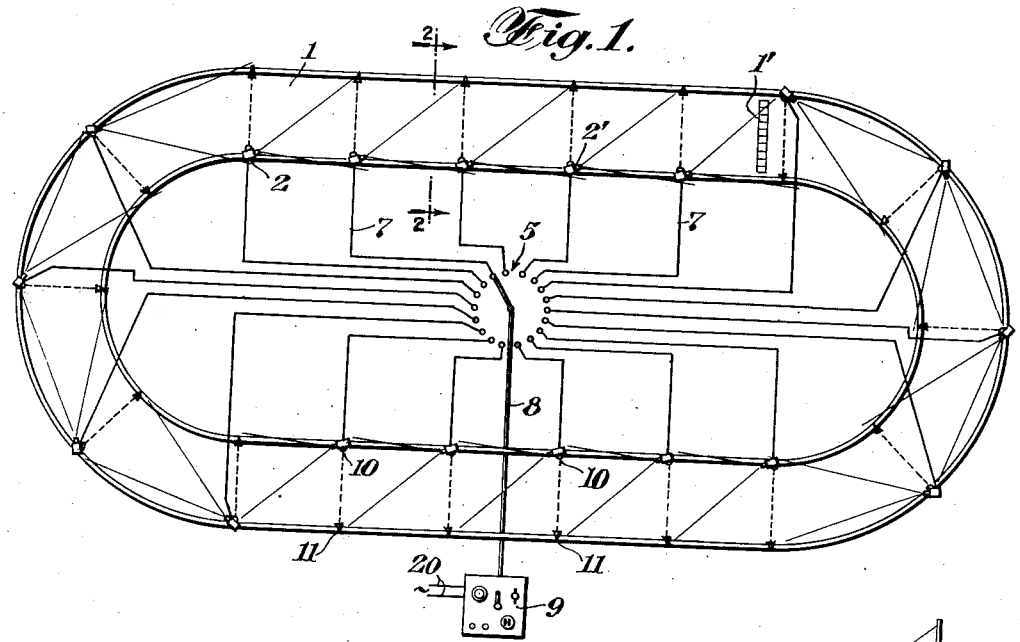
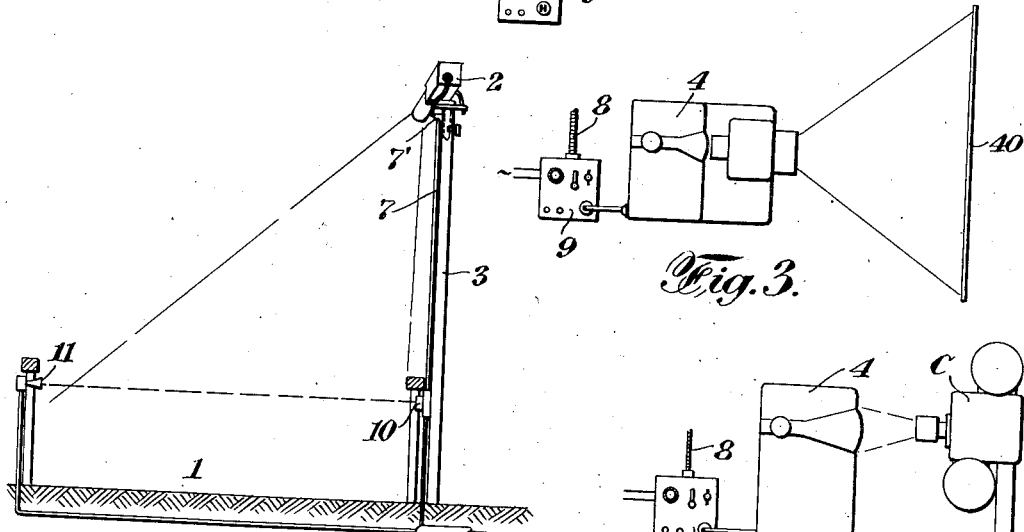
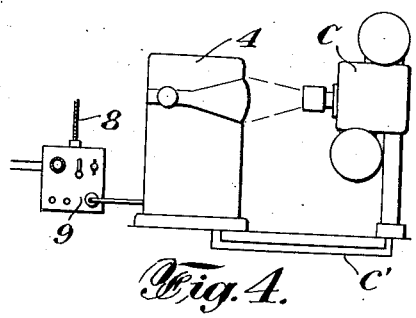
INVENTOR
Harry A. Rose
BY Kenyon & Kenyon
ATTORNEYS Jan. 13, 1942.                H. A. ROSE                2,269,862
                REPRODUCTION AND RECORDING OF RACES
                     Filed Aug. 1, 1941         2 Sheets-Sheet 2
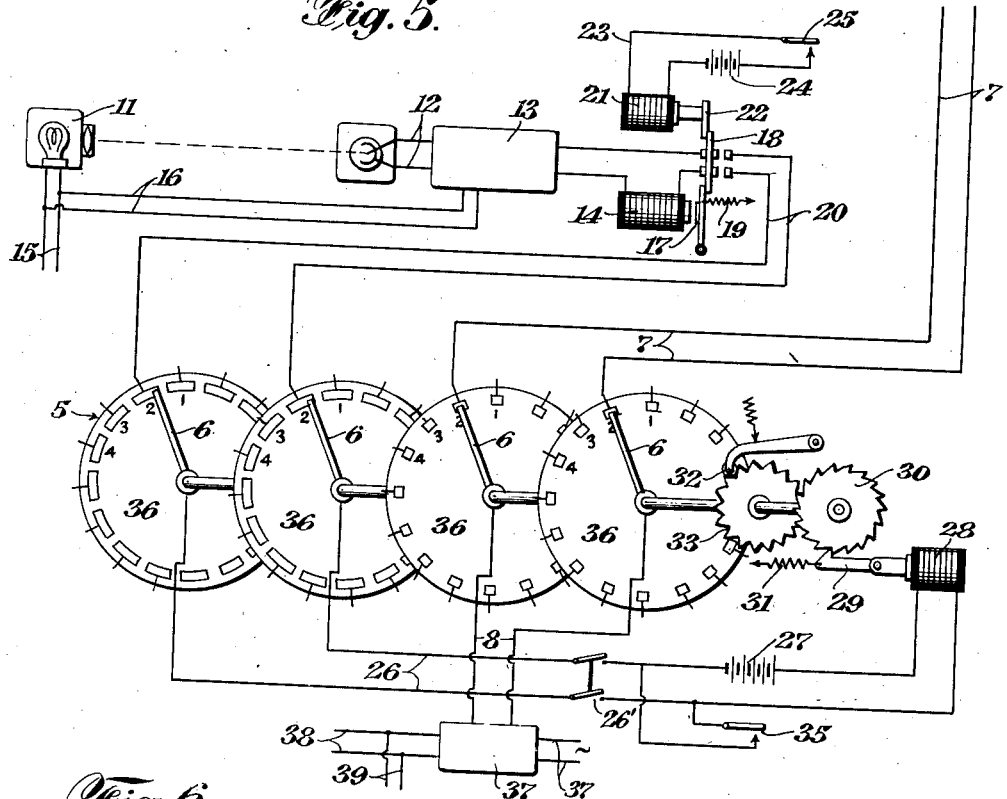
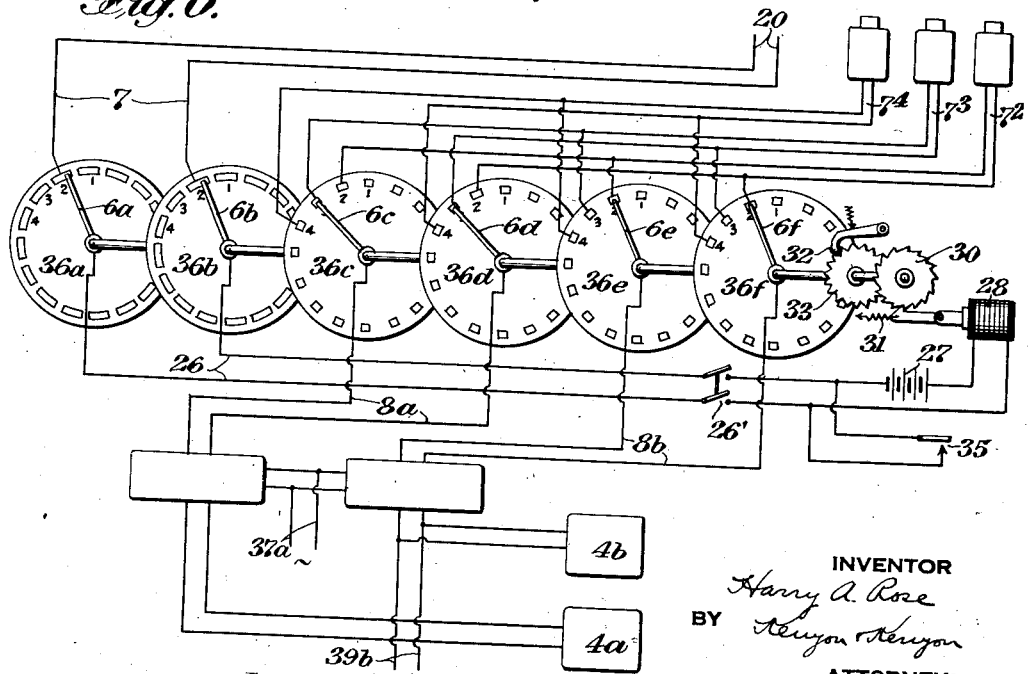
INVENTOR
Harry A. Rose
BY Kenyon & Kenyon
ATTORNEYS Patented Jan. 13, 1942

2,269,862

UNITED STATES PATENT OFFICE 2,269,862

REPRODUCTION AND RECORDING OF RACES

Harry A. Rose, Larchmont, N. Y., assignor of one-half to Crawford Hill, Newport, R. I.

Application August 1, 1941, Serial No. 405,023

24 Claims. (Cl. 178—6)

This invention relates to the reproduction and recording of races.

One of the objects of the invention is to provide the judges in the central judges' booth with a continuous close-up view of each race, so as to permit the ready detection of fouls.

Another object of the invention is to show a close-up of the race on a screen simultaneously with the running of the race, so that it may be seen by a number of spectators, either in the spectator area of the race track or in other places, such as clubs or taverns.

A further object of the invention is to provide a complete permanent motion picture close-up of each race, which can be referred to any time, for example, for the settlement of disputes or exhibited wherever it is desired to reproduce the race, as in motion picture theatres.

Other objects of the invention will appear from the following detailed description and the appended claims.

The accompanying drawings, forming a part of this specification, illustrate the invention.

In the drawings:

Figure 1 is a diagrammatic plan view of a race track or course containing one embodiment of my invention;

Figure 2 is a vertical cross sectional view on a larger scale, taken on the line 2—2 of Figure 1;

Figures 3 and 4 are diagrammatic views illustrating features of the invention;

Figure 5 is a diagram showing the circuits of the embodiment of my invention shown in Fig. 1; and Figure 6 is a diagram showing the circuits of a modification.

At regular intervals around the track 1 a number of cameras 2 are arranged so that their fields of view are directed longitudinally of the track toward the direction from which the racers come. The fields of the cameras are preferably arranged to overlap so that each point of the track is covered by the field of at least one camera. As shown, the cameras for the straight portions of the track are arranged on the inside of the track, whereas the cameras for the curved end portions of the track are arranged at the outside of the track. In this way the whole track can be effectively covered by the fields of the cameras. The cameras are preferably supported, as by posts 3, at a considerable elevation above the track as shown in Fig. 2 and directed downwardly towards the track. They are preferably television cameras; but in one embodiment of my invention, motion picture cameras may be used.

When television cameras are used, they are operatively connected in proper order and at the proper time to a television receiver 4. For this purpose, I employ a selector switch 5. One form of such a switch is shown in Fig. 5. It comprises a multiple arm 6 which is arranged to successively engage contacts connected with the respective cables 7 from the various cameras and to thereby electrically connect said cables with the cable 8 leading through the junction box 9 to the receiver 4.

I preferably provide means whereby the selector switch 5 may be automatically operated so that each camera will be connected to the receiver while racers are in its field. As shown in Fig. 1, a number of photoelectric cells 10, one for each camera, are arranged around the track. Each cell has a light source 11 arranged to project a beam of light across the track in the path of the racers and upon its photoelectric element. Referring to Fig. 5, the cells 10 are each arranged in a circuit 12 which also contains a vacuum tube amplifier 13 and an electromagnet 14. Current for the light source 11 and the amplifier 13 may be supplied through circuits 15 and 16 respectively. The electromagnet 14 has a pivoted armature 17 which carries a contact switch or relay member 18 which is arranged to close the circuit 12 (as shown) when the electromagnet is sufficiently energized. A spring 19 tends to hold the control switch 18 in a position corresponding to the opening of the circuit 12 and the closing of a circuit 20 leading to the selector switch.

For resetting the control relay 18 after it has been moved to close circuit 20 I provide an electromagnet 21 whose armature is connected, as at 22, with the relay. The electromagnet 21 is arranged in a circuit 23 which also contains a battery 24 or other source of current and a control switch 25.

Through the selector switch 5, each circuit 20 is adapted to be connected in turn to a circuit 26 containing a suitable source of current, such as the battery 27, and a solenoid electromagnet 28. The armature of the electromagnet 28 carries a pawl 29 arranged to operate a ratchet wheel 30 which is fixed to the same shaft as the arms 6 of the selector switch. A spring 31 tends to hold the pawl 29 biased against the action of the magnet 28.

To ensure the movement of the selector switch arms 6 the full and proper distance to their next operative position when the pawl 29 moves the ratchet 30, I provide a pivoted roller pawl 32 coacting with the toothed periphery of the snap ratchet wheel which is also secured to the shaft of the selector switch arms 6. A spring 34 tends to draw the pawl into the spaces between the teeth of the ratchet wheel 33. Thus when the pawl 29 has moved the ratchet wheel 30 and the shaft of the selector switch arms a distance sufficient to cause the roller pawl 32 to start its descent into one of the spaces between the teeth of ratchet wheel 32, the pawl 32 exerts a cam action on the said wheel and ensures its continued movement and the movement of the selector switch arms until the roller pawl has reached the bottom of its notch and the selector arms have reached their next operative positions.

For manually operating the selector switch arms, I provide a switch 35 arranged to effect closing of the circuit containing the electromagnet 28 at will. The switch 35 may be operated from any suitable place at the track, for example the judges' stand. To disconnect the portion of the circuit 26 controlled by the switch 35 from the portion containing the selector switch arms 6 so as to eliminate the automatic action of the selector switch, I employ a switch 26'.

The selector switch is preferably of gang construction, comprising a plurality of contact plates 36 and a movable switch arm 6 for each plate. Each plate 36 has a number of contacts corresponding to the number of cameras. As shown, the contact plates are for convenience of illustration shown side by side, although in actual construction, they will, of course, be co-axially superposed on the shaft to which all of the selector switch arms are secured. In Fig. 5, the contact plate to the left has its contacts each connected to one conductor of the corresponding circuits 20, and the next contact plate to the right has its corresponding contact respectively connected to the other conductor of the same circuit. The selector arms 6 for these plates are electrically connected to the conductors of the circuit 26 containing the electromagnet 28 for operating the pawl 29 and ratchet 30. Thus, when the arms 6 engage a given pair of contacts on their contact plates they serve to connect the circuit 20 controlled by the corresponding photoelectric cell to the ratchet operating circuit 26.

The two selector switch plates to the right in Fig. 5 are as shown, connected through their respective contacts with various video output circuits from the television cameras; and the switch arms for those plates are adapted to connect those circuits successively with the conductors 8 leading to the central amplifier 37 having a source of power 37' and thence through circuit 38 to the television receivers at the track and also through circuit 39 to an outside television broadcast station. From the broadcast station, the race may be sent by television to receivers located at desired places, such as theatres, clubs, or taverns.

The television receiver 4 may be of the projector type as shown in Fig. 3. In that case, I provide a screen 40 upon which the television images may be thrown by the receiver. This screen may be arranged in any suitable location, for example in the judges' room or for spectators either at the race track or at any other desirable location. The cameras 2 may be detachably supported by the posts 3, which may be provided with a suitable connection 7', whereby the cameras may be plugged into electrical connection with the cables 7. This enables the cameras to be arranged in selected positions on certain of the posts only, but of course the selector switch 5 must be provided with a corresponding arrangement of contacts if the cameras are to be connected to the receivers automatically. The cameras at any location, may, of course, be connected to the circuit 8 by manual operation of the switch 35.

To reduce the number of cameras needed, I may use turret cameras with lenses of different focal lengths. When such cameras are used, the turret may be shifted in any suitable way, for example by remote control (not shown), to bring the lenses into operation in proper order as the racers approach the camera. The lens with the greatest focal length will, of course, be used when the racers are in the most remote part of the field of a given camera.

In operation, the cameras having been arranged upon the proper supports and connected to the cable 7 and the photoelectric cells 10 and their light sources having been set into operation, the racers start, say from the starting gate 1'. The first camera 2' covers the starting point of the race for a close-up view, and through the connection 7, the selector switch 5 and the cable 8, it shows a picture of the start of the race on the receiver 4 or the screen 40. As soon as the leading horse passes the beam of the first photoelectric cell, it interrupts that beam causing the photoelectric cell to effect a momentary reduction of current in the circuit 12, and a proportionate drop in the output of amplifier 13. This deenergizes the electromagnet 14 sufficiently to permit spring 19 to move relay 18 to open the circuit containing electromagnet 14, and to close circuit 20 leading to the selector switch 5. The circuit containing the electromagnet 14 being now open at relay 18, further variations of the beam leading to the photoelectric cell in question cannot effect the operation of the selector switch. However, the circuit 20 being closed by relay 18, and connected through the selector switch to circuit 26, the pawl 29 is operated by electromagnet 28 to shift ratchet wheel 30 and selector switch arms 6 to their next positions corresponding to the next camera in the course of the race. That camera is thereby connected through the selector switch to the receiver circuit 8 while the preceding camera is disconnected therefrom. As the race proceeds, the leading horse or other racer modifies the beam for the various photo-electric cells in succession and causes the selector switch arms to be moved step by step thus connecting the cameras successively with the receivers as the leading horses come within the range of the cameras for a close-up view of the race. Thus the whole race may be seen as a close-up upon the television receiver.

Before each race, the relays 18 are reset, as shown, by closing switch 25.

If it is desired to make a permanent record of the whole race, this may be done as shown in Fig. 4, where the motion picture camera C is arranged to take a permanent picture of the images upon the screen of the television receiver 4. In order that this may be properly done, the motion picture camera and the television apparatus should be synchronized. This may be done with a synchronizing circuit C'.

Where the cameras 2 are motion picture cameras, the television receiver 4 is disconnected from the junction box 9. Current for the cables 7 and 8 is supplied from a suitable source 20 to the junction box 9, which may be provided with a suitable switch for connecting the current source. The motion picture cameras are arranged in the same way as are the television cameras. All of the cameras are provided with electric motors and these motors are successively set into operation by the selector switch 5. At the start of the race, the selector switch is arranged to cause the motor of the first camera to operate that camera; and as the leading horse passes the successive light beams for the photoelectric cells, it causes the selector switch to be advanced at each beam so as to throw into operation the successive cameras while the leading horses are within their respective fields for a close-up view. In this way each camera will make a motion picture record of a close-up of a section of the race. The films from the various cameras can be pieced together so as to make a complete photographic record of the race.

It may at times be desirable to get a close-up view with a plurality of cameras and receivers at the same time. One arrangement for achieving this purpose is shown in Fig. 6. Referring to that figure, the circuits 7 controlled by the photoelectric cells are connected to the contacts of the two selector switch plates 36a and 36b and are connected through arms 6a and 6b and circuit 26 with the pawl and ratchet mechanism for shifting the selector switch arms the same as in the form of invention shown in Fig. 5. However, four additional contact plates and four additional selector switch arms are provided and electrically connected to the camera and receiver circuits as shown. For illustration, the video output camera circuits 7², 7³ and 7⁴ are shown. The conductors of each of these circuits are electrically connected not only to the contacts of plates 36c and 36d respectively (as in Fig. 5) but also to the corresponding contacts of plates 36e and 36f.

For example circuit 7² has its conductors connected respectively to contacts 2 of plates 36c and 36d and also to the contacts 2 of plates 36e and 36f. The conductors of circuit 7³ are similarly connected to contacts 3 of the selector switch plates 36c, 36d, 36e, and 36f, and the conductors of circuit 7⁴ are similarly connected to contacts 4 of the said plates and so on. The contact arms 6c and 6d serve to electrically connect the various contacts on plates 36c and 36d with a circuit 8a leading to receiver 4a. The contact arms 6e and 6f serve to electrically connect the contacts on plates 36e and 36f with circuit 8b leading to receiver 4b and, through conductors 39b, to an outside television broadcast station. However, contact arms 6c and 6d are arranged one step ahead of contact arms 6e and 6f, so that while the arms 6c and 6d are contacting contact 3 of plates 36c and 36d, for example, contact arms 6e and 6f are contacting the preceding contacts 2 of the plates 36e and 36f. Power from a suitable source may be supplied, as by circuit 37a to both circuit 8a and circuit 8b.

In the apparatus shown in Fig. 6, let us assume that the racers are within the range of the camera having the circuits 7² and 7³, being close-up for the former camera and in the middle distance for the other. When the selector switch arms are arranged as shown in Fig. 6, circuit 7³ is connected to receiver 4a and the circuit 7² is connected to receiver 4b; so that the fields of the cameras in circuits 7³ and 7² will be shown on the receivers 4a and 4b respectively. When the leading racer passes the beam for the next photoelectric cell, the circuit 26 containing arms 6a and 6b will cause the ratchet mechanism 29, 30 (see Fig. 5) to advance the selector switch arms to the next contacts on the selector switch plates. The result will be that arms 6c and 6d will connect circuit 7⁴ with circuit 8b containing receiver 4a, and arms 6e and 6f will connect circuit 7³ with circuit 8b containing receiver 4b. Thus the fields of cameras in circuits 7³ and 7⁴ will be shown on receivers 4b and 4a respectively and the camera in circuit 7² will be disconnected from the receivers It is to be understood that many modifications of the specific apparatus described above may be made without departing from my invention

I claim:

1. The combination of a track, a plurality of cameras at points around the track, and automatic means for selectively controlling the operation of said cameras by the movement of a racer in the respective fields thereof and including a unitary control member for all of said cameras, and beam controlled means at successive points around said track for operating said unitary control member in response to passage of said racer successively past each of said beam controlled means, said last-named means including means rendering each beam controlled means in turn inoperative for further action on said unitary control member after said racer has passed the respective beam controlled means.

2. The combination of a track, a plurality of cameras at points around the track, means including a selector switch connected to all of said cameras for selectively controlling the operation of said cameras, and beam controlled means at each of said points for operating successively the said selector switch in response to passage of a racer successively past each of said points, said beam controlled means including means rendering each beam controlled means in turn inoperative for further actuation of said selector switch after said racer has passed the respective points, and means for resetting each of said beam controlled means to operative condition.

3. The combination of a track, a plurality of cameras at points around the track with their fields of view overlapping whereby each point of the track is covered by the field of at least one camera, the fields of the cameras being directed longitudinally of the track, and means including a selector switch for selectively rendering said cameras operative by the movement of a racer in the respective fields thereof and including a unitary control member for all of said cameras, and beam controlled means at successive points around said track for operating said unitary control member in response to passage of said racer successively past each of said beam controlled means, said last-named means including means rendering each beam controlled means in turn inoperative for further action on said unitary control member after said racer has passed the respective beam controlled means.

4. The combination of a track, a plurality of cameras at points around the track, and automatic means for selectively controlling the operation of said cameras by the movement of a racer in the respective fields thereof, said means including a unitary control member for all of said cameras and photoelectric cell means and light sources therefor arranged to transmit light rays across the track in the path of the racers at each of said points for operating successively the said unitary control member in response to passage of said racer successively past each of said points, said photoelectric cell means including means rendering each photoelectric cell means in turn inoperative for further actuation of said unitary control member after said racer has passed the respective points.

5. The combination of a track, a plurality of cameras at points around the track, and automatic means for selectively controlling the operation of said cameras by the movement of a racer in the respective fields thereof, said means including a circuit containing a photoelectric cell, a light source for the cell, a relay, means whereby fluctuation in the current in said circuit is adapted to operate said relay, means whereby operation of said relay breaks the circuit to said cell, and a switch controlled by such operation of said relay for successively rendering said cameras operative.

6. The combination of a track, a plurality of cameras at points around the track, and automatic means for selectively controlling the operation of said cameras by the movement of a racer in the respective fields thereof, said means including a circuit containing a photoelectric cell, a light source for the cell, a relay, means whereby fluctuation in the current in said circuit is adapted to operate said relay and render the same inoperable by further fluctuations in said circuit, a switch controlled by said relay and means for resetting said relay.

7. The combination of a track, a plurality of television cameras at points around the track, a television receiver, and automatic means governed by the position of a racer on the track for selectively connecting said cameras to said receiver, said means including a unitary control member for all of said cameras, and beam controlled means at successive points around said track and capable of operating said unitary control member in response to passage of said racer successively past each of said beam controlled means, and said beam controlled means including means rendering each beam controlled means in turn inoperative for further action on said unitary control member after said racer has passed the respective beam control means.

8. The combination of a track, a plurality of television cameras at points around the track, a television receiver, automatic means governed by the position of a racer on the track for selectively connecting said cameras to said receiver while racers are in the respective fields thereof, said means including a unitary control member for all of said cameras, and photoelectric cell means and light sources therefor arranged to transmit rays across the track in the path of the racers at each of said points for operating successively the said unitary control member in response to passage of said racer successively past each of said points, said photoelectric cell means including means rendering each photoelectric cell means in turn inoperative for further actuation of said unitary control member after said racer has passed the respective points.

9. The combination of a track, a plurality of television cameras at points around the track, a television receiver, means including a switch for selectively connecting said cameras to said receiver, and means including a plurality of sets of photoelectric cells and light sources therefor arranged at intervals around the track to transmit light rays across the track in the path of the racers for controlling successively the operation of said switch by the passage of one only of said racers between successive sets of said cells and light sources.

10. The combination of a track, a plurality of television cameras at points around the track with their fields overlapping whereby each point of the track is covered by the field of at least one camera, the fields of the cameras being directed longitudinally of the track, a television receiver and projector, means including a switch for selectively connecting said cameras to said receiver and projector, means including a plurality of sets of photoelectric cells and light sources therefor arranged at intervals around the track to transmit light rays across the track in the path of the racers for controlling successively the operation of said switch by the passage of one only of said racers between successive sets of said cells and light sources, and a screen on which the picture from said projector may be thrown.

11. The combination of a track, a plurality of television cameras at points around the track, a television receiver, means including a switch for selectively connecting said cameras to said receiver, means including a plurality of sets of photoelectric cells and light sources therefor arranged at intervals around the track to transmit light rays across the track in the path of the racers for controlling successively the operation of said switch by the passage of one only of said racers between successive sets of said cells and light sources, and means for detachably supporting said cameras, said supporting means having means for detachably uniting said camera and said connecting means.

12. The combination of a track, a plurality of cameras at points around the track, beam-controlled means located at a plurality of positions and each responsive to the position of a racer for selectively rendering said cameras operative, and including a unitary control member for all of said cameras, and means for rendering each of said automatic means in turn incapable of operating said unitary control member by action of racers other than said first-named racer, and means for detachably supporting said cameras, said supporting means having means for detachably uniting said cameras to said first named means.

13. The combination of a track, a plurality of television cameras at points around the track, a plurality of television receivers, means responsive to the movement of a racer for selectively connecting said receivers with different groups of cameras and disconnecting the same from other cameras, said means including a unitary control member, beam-controlled means at points around said track for operating said control member in response to the position of said racer, and means for preventing operating of said beam-controlled means in turn by racers other than that first-named.

14. The combination of a track, a plurality of television cameras at points around the track, a plurality of television receivers, automatic means responsive to movement of a racer for selectively connecting said receivers with different groups of cameras and disconnecting the same from other cameras, and means for preventing operation of said automatic means by racers other than that first-named, said automatic means including a unitary control member, photoelectric cells and light sources therefor arranged to transmit light rays across the track in the path of the racers, each said cell being adapted to operate said unitary control member.

15. The combination of a track, a plurality of television cameras at points around the track, a plurality of television receivers, means including a switch for selectively connecting said receivers with different groups of cameras, and means including a plurality of sets of photoelectric cells and light sources therefor arranged to transmit light rays across the track in the path of the racers for controlling the operation of said switch by each cell in turn upon interruption by a racer of light rays from its associated light source, and means in conjunction with each of said cells to prevent controlling action thereby on said switch by racers other than that first-named.

16. In apparatus for obtaining a continuous close-up view of a race, the combination with a track, of television cameras having their fields directed longitudinally of the track and being located at spaced points around said track, at least one television receiver adapted to be actuated by any of said cameras, a selector switch, an electric circuit connecting said receiver with said switch, electric circuits, one connecting each of said cameras with said switch, said switch serving to connect selectively said receiver connecting electric circuit with any one of said camera connecting electric circuits and automatic means for so operating said switch, said automatic means including a beam responsive member at each said point of said track, each connected in an electric circuit with a portion of said switch, a beam source in conjunction with each beam responsive member so positioned that interruption of any beam by a racer will affect the corresponding beam responsive member to effect operation of said automatic means, and means in each beam responsive electric circuit to render such latter circuit ineffective for operation of said switch by any racer other than that first-named, whereby, during the course of a race each camera in turn into whose field said racer moves will be automatically connected to said receiver, and the cameras of those fields which said racer has left will be automatically disconnected from said receiver.

17. In apparatus for obtaining a continuous close-up view and record of a race, the combination with a track of television cameras having their fields directed longitudinally of the track and being located at spaced points around said track, at least one television receiver adapted to be actuated by any of said cameras, a motion picture camera focused on an output screen of said receiver, a selector switch, an electric circuit connecting said receiver with a portion of said switch, electric circuits, one connecting each of said television cameras with other portions of said switch, said switch serving to connect selectively said receiver connected electric circuit with any one of said television camera connected electric circuits, and automatic means for so operating said switch by moving said first-named switch portion into electrical connection with respective of said second-named switch portions, said automatic means including a beam responsive member at each said point of said track each connected by an electrical circuit to another portion of said switch, a beam source in conjunction with each beam responsive member so positioned that interruption of any beam by a racer will affect the corresponding beam responsive means to effect operation of said automatic means, means in each beam responsive electric circuit to render each latter circuit ineffective for operation of said switch by any racer other than that first-named, whereby during the course of a race each television camera in turn into whose field said racer moves will be automatically connected to said receiver, while the television cameras of those fields which said racer has left will be automatically disconnected from said receiver, and means for resetting each beam responsive circuit to effective condition.

18. In apparatus for obtaining a continuous close-up record of a race, the combination with a track of cameras having their fields directed longitudinally of the track and being located at spaced points around said track, a selector switch, an activating circuit connected with one portion of said switch, electric circuits one connecting each of said cameras with other portions of said switch, said switch serving to connect selectively said activating circuit with any one of said camera connected circuits, and automatic means for so operating said switch by moving said first-named switch portion into electrical connection with respective of said second-named switch portions, said automatic means including a beam responsive member at each said point of said track, each connected by an electrical circuit to another portion of said switch, a beam source in conjunction with each beam responsive member so positioned that interruption of any beam by a racer will affect the corresponding beam responsive means to effect operation of said automatic means, means in each beam responsive electric circuit to render each latter circuit ineffective for operation of said switch by any racer other than that first-named whereby during the course of a race each camera in turn into whose field said racer moves will be automatically activated while the cameras of those fields which said racer has left will be automatically de-activated, and means for resetting each beam responsive circuit to effective condition.

19. In a device as per claim 16, in which said automatic means also includes a solenoid operated driving member for effecting movement of portions of said selector switch, the solenoid of said member being connectable through said switch with any of said beam responsive circuits.

20. In a device as per claim 16, in which said last-named means includes a relay in each beam responsive circuit adapted normally to maintain the beam responsive circuit closed and to open the latter upon fluctuation of current in said beam responsive circuit.

21. In a device as per claim 16, in which said selector switch comprises a plurality of fixed contacts, pairs of which are connected respectively to the terminals of each circuit other than said receiver circuit, and a plurality of movable pairs of contact arms adapted to connect respective pairs of said stationary contacts respectively with said receiver circuit and the automatic operating means for said switch.

22. In apparatus for obtaining a continuous close-up view of a race the combination with a track, of a plurality of television cameras at points around the track, receivers all adapted to be actuated by any of said cameras, a selector switch for selectively connecting said receivers with any of said cameras, a plurality of means one located at each of said points and each adapted in turn to control operation of said switch by the position of a racer on said track with respect to a particular point, and means in conjunction with each of said first-named means for preventing control action of the latter on said switch by racers other than that first-named passing said particular point.

23. In apparatus for obtaining a continuous close-up view of a race the combination with a track, of a plurality of television cameras at points around the track, receivers all adapted to be actuated by any of said cameras, a selector switch for selectively connecting said receivers with any of said cameras, a plurality of means one located at each of said points and each adapted in turn to control operation of said switch by the position of a racer on said track with respect to a particular point, means in conjunction with each of said first-named means for preventing control action of the latter on said switch by racers other than that first-named passing said particular point and means for resetting each of said first-named means for control action on said selector switch.

24. In apparatus for obtaining a continuous close-up view of a race the combination with a track, of a plurality of television cameras at points around the track, receivers all adapted to be actuated by any of said cameras, a selector switch for selectively connecting said receivers with any of said cameras, a set comprising a photoelectric cell and a source of light therefor adapted to direct light rays across the track to said cell located at each of said points, an electric circuit connecting each cell with said selector switch to control its operation by interruption of the light rays to the said cell by a racer passing a particular point, a relay in conjunction with each said circuit responsive to said interruption for disconnecting the circuit of the interrupted cell and preventing control action thereby on said switch by racers other than that first-named passing said particular point, and means for resetting each of said cell circuits for control action on said switch.

HARRY A. ROSE.